April 27, 1965   J. E. ADAMS   3,179,966
TRANSFER AND TAPPING MECHANISM FOR SHEET METAL FASTENERS
Filed Sept. 16, 1963   5 Sheets-Sheet 1
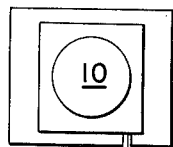
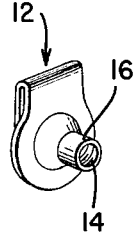
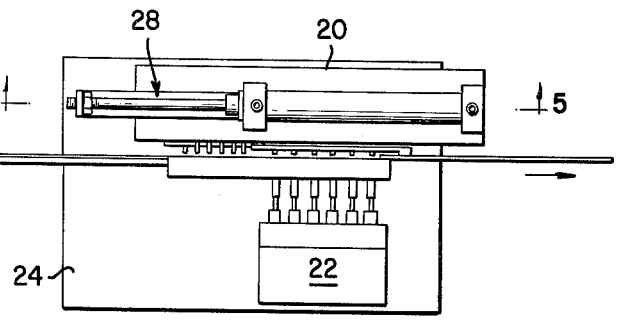
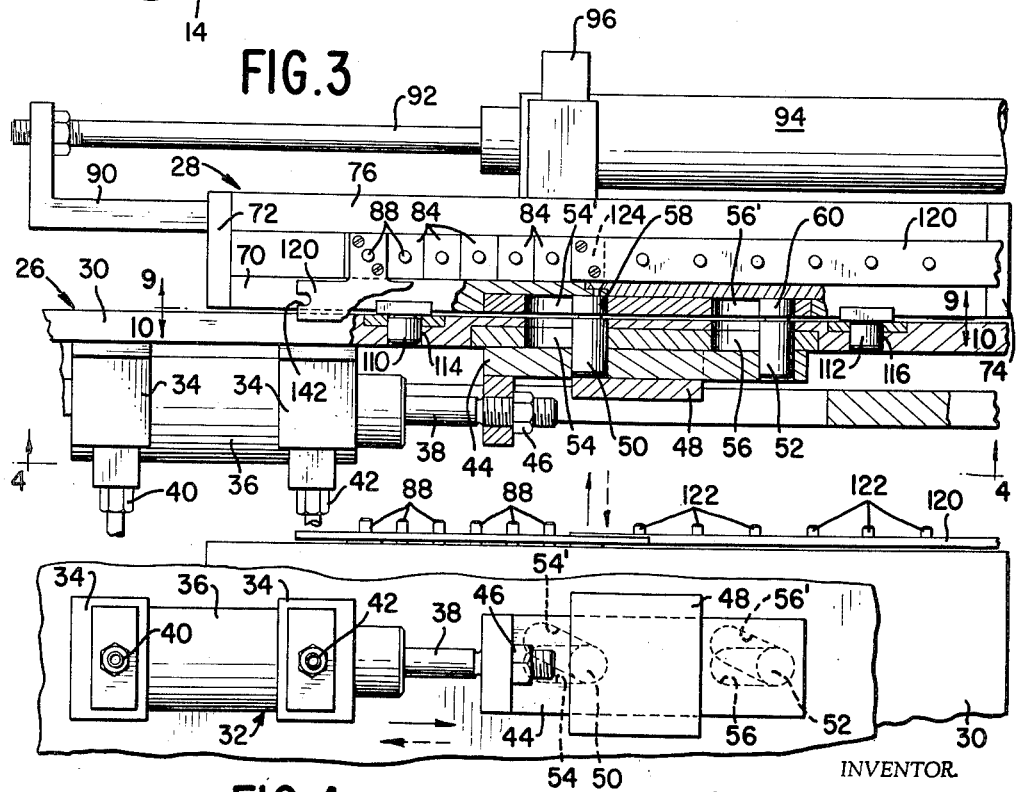
INVENTOR.
JAMES E. ADAMS
BY Malcolm W. Fraser
ATTORNEY

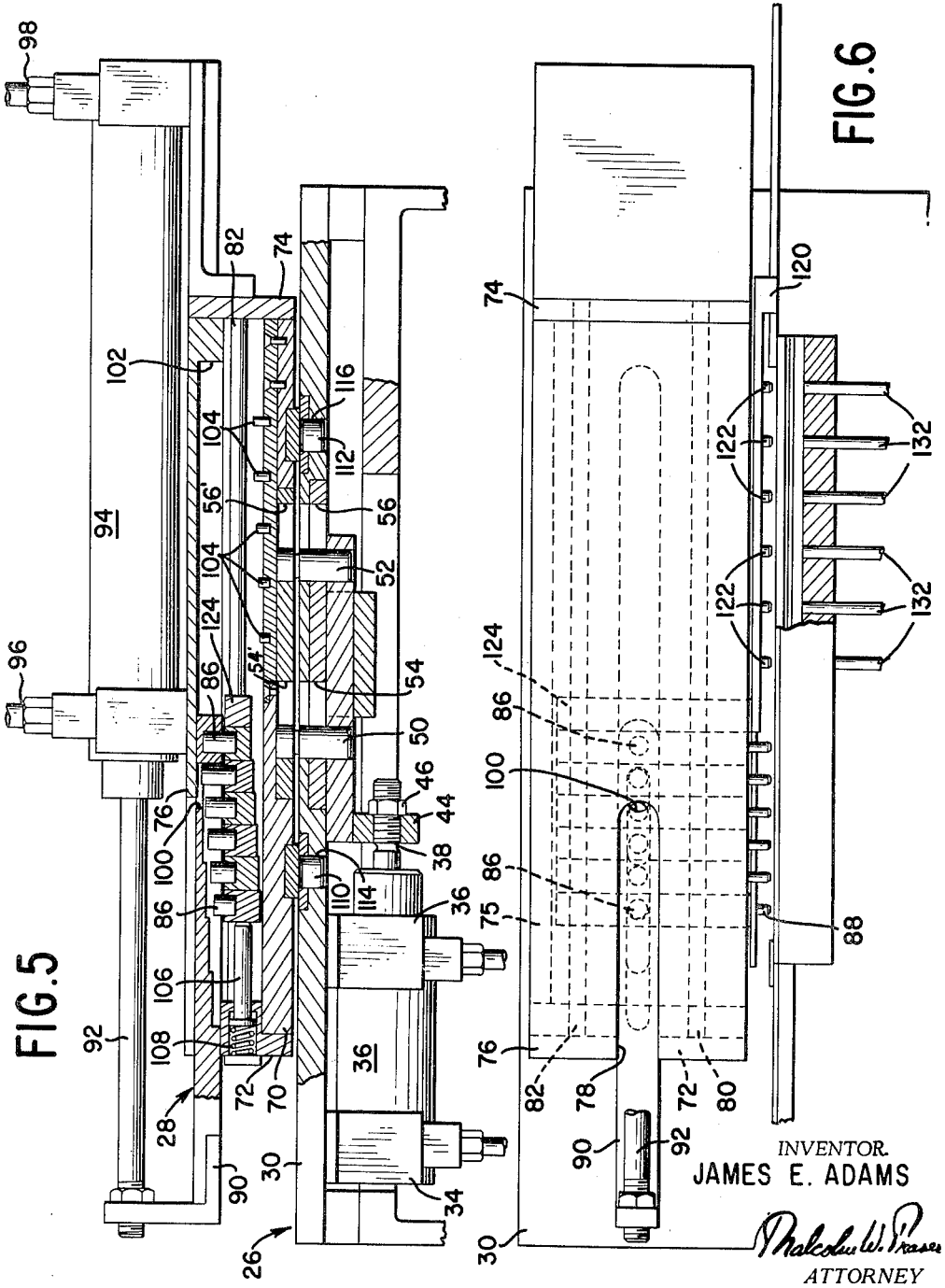

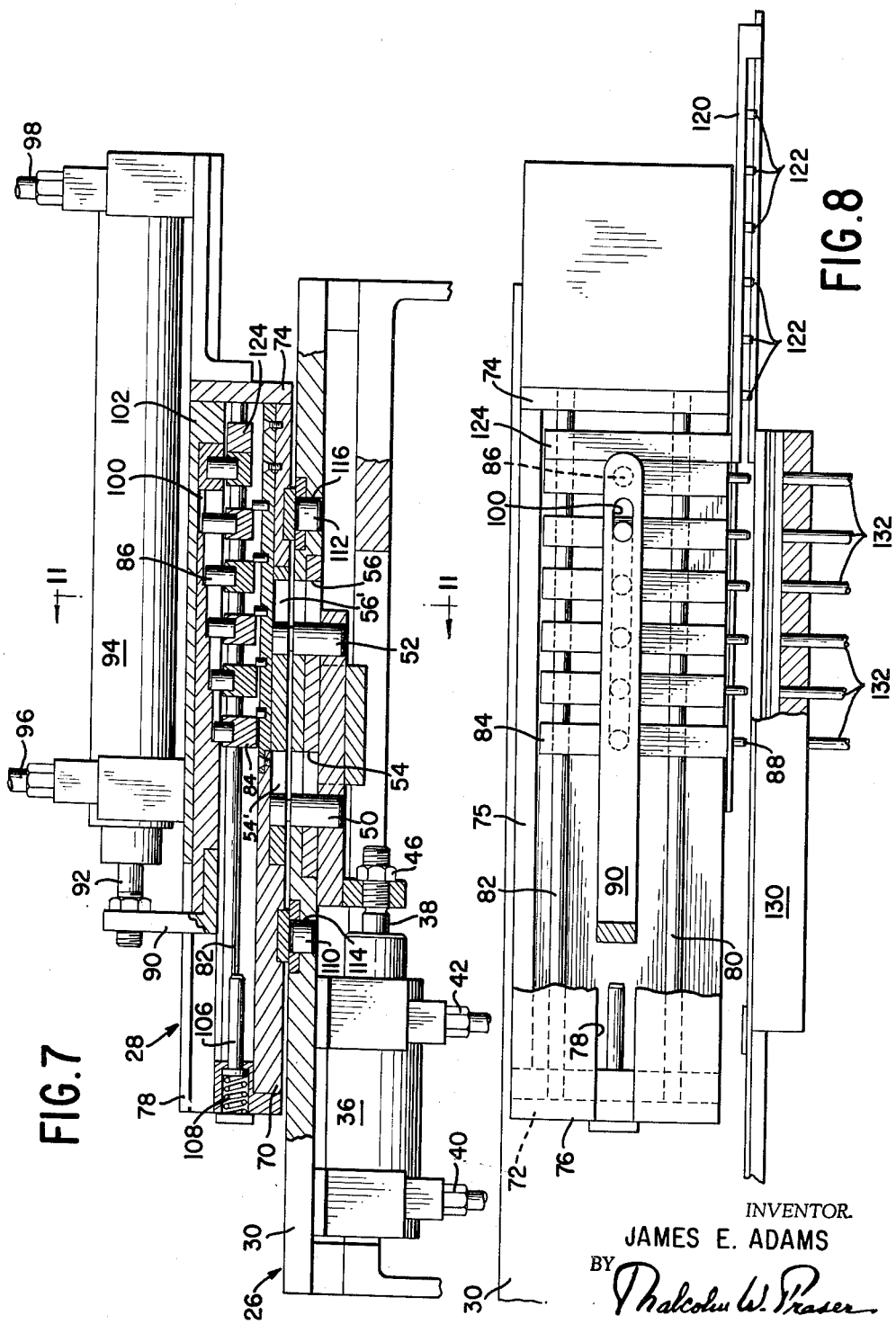

April 27, 1965  J. E. ADAMS  3,179,966
TRANSFER AND TAPPING MECHANISM FOR SHEET METAL FASTENERS
Filed Sept. 16, 1963  5 Sheets-Sheet 4
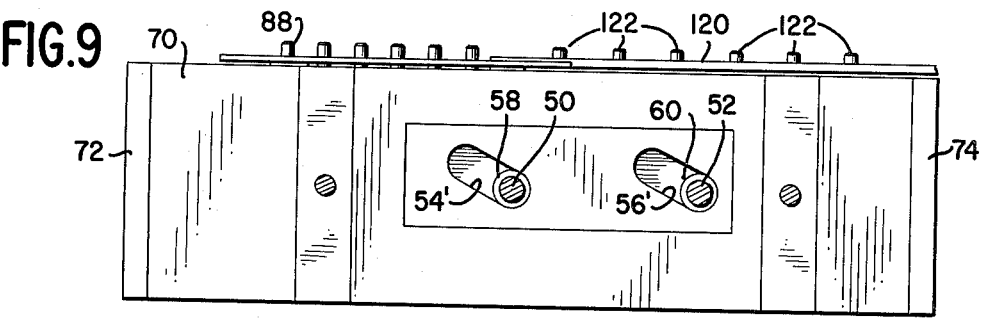
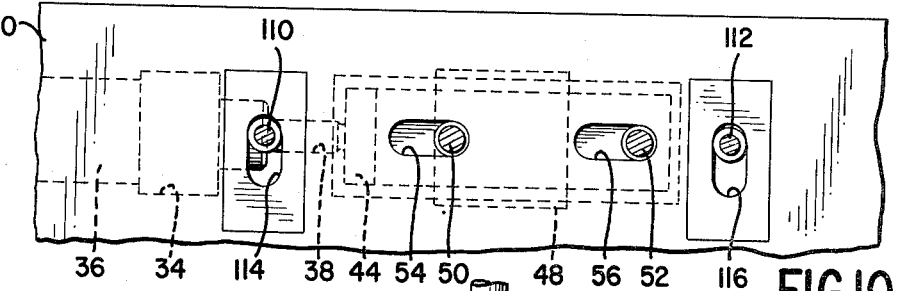
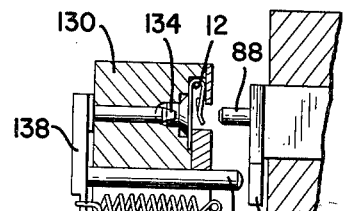
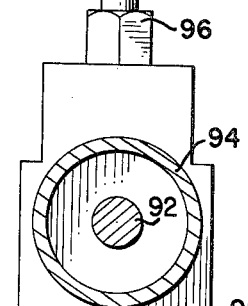
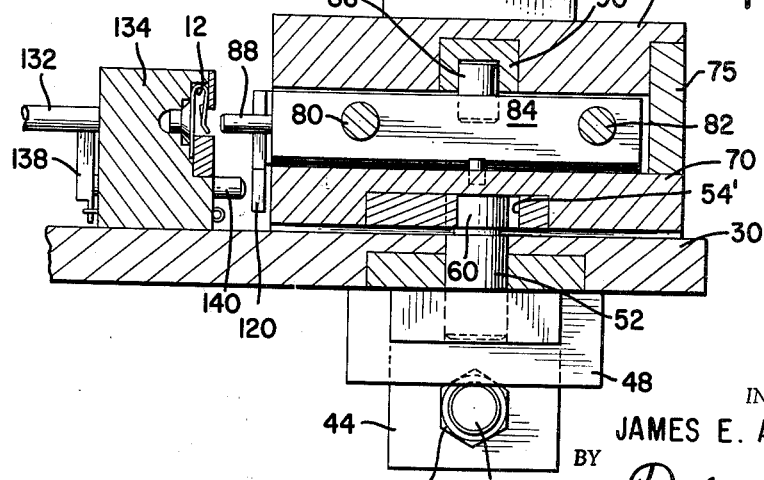
INVENTOR.
JAMES E. ADAMS
BY
Malcolm W. Fraser
ATTORNEY

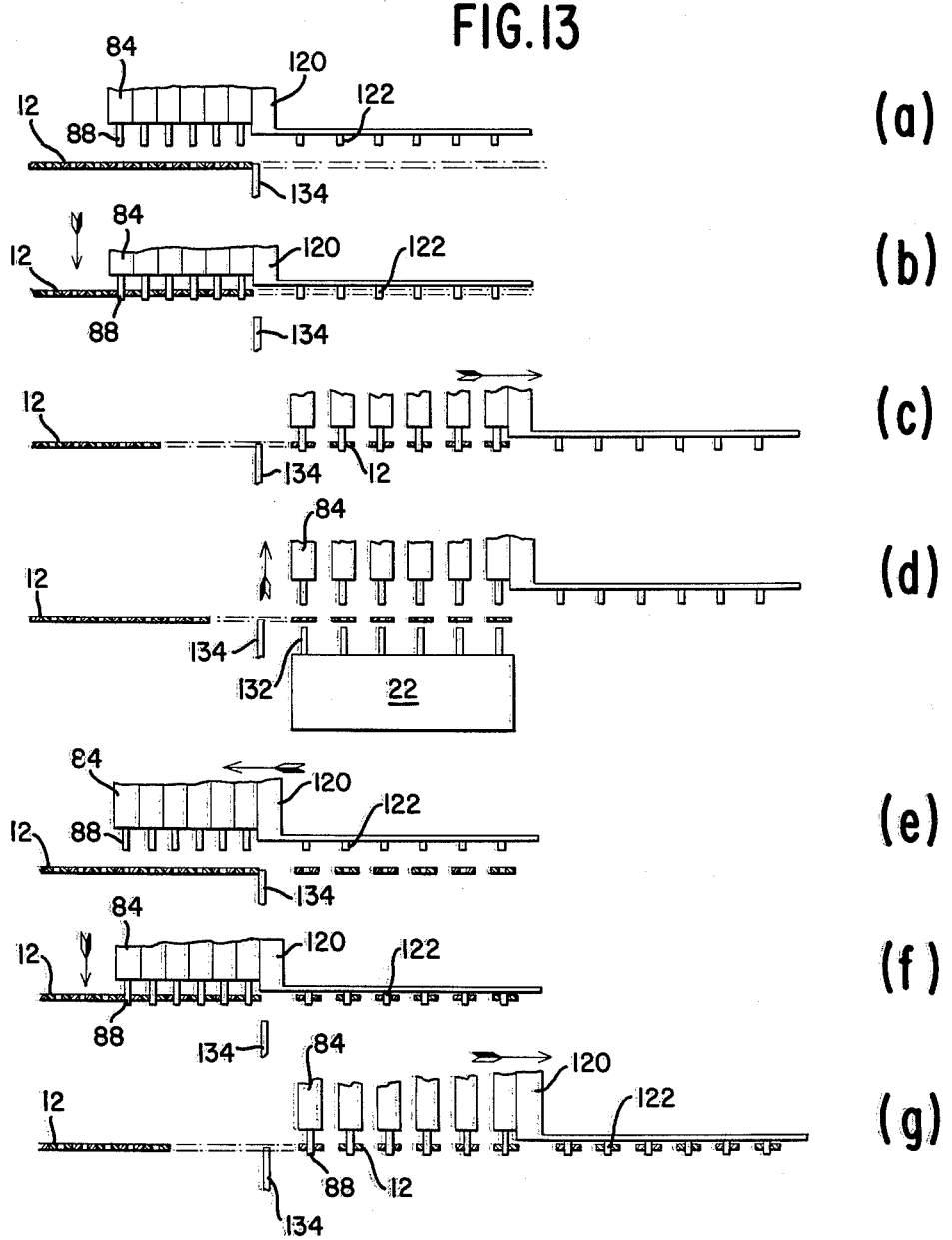

United States Patent Office 3,179,966
Patented Apr. 27, 1965

3,179,966
TRANSFER AND TAPPING MECHANISM FOR SHEET METAL FASTENERS
James E. Adams, Toledo, Ohio, assignor to The Bishop and Babcock Corporation, Toledo, Ohio, a corporation of Ohio
Filed Sept. 16, 1963, Ser. No. 308,945
6 Claims. (Cl. 10—130)

The present invention relates to a transfer mechanism and more particularly to an apparatus for transferring and positioning a plurality of parts from one position of machining to another.

In the manufacture of sheet metal fasteners from a strip of metal stock formed by high speed punch press equipment having cooperating die members which perform the desired punching, cutting, bending, or similar operations, the punch press equipment is capable of producing as many as two hundred and fifty to three hundred parts per minute. It has been found extremely difficult, if not impossible, to form threads on the individual parts at a rate equal to the rate at which the presses are capable of performing. Therefore, it has been impossible to achieve a continuous production line procedure wherein the metal strip stock is fed into one end of a production line and the finished threaded sheet metal fasteners are continuously discharged from the other end into shipping containers.

It is a principal object of the invention to produce a transfer mechanism for transferring sheet metal parts in ganged relation from one position to another to be tapped and then moved to another position.

Another object of the invention is to produce a transfer apparatus particularly useful in connection with a multihead tapping machine which is capable of transferring and separating or spacing a plurality of juxtaposed parts, securing the parts during a tapping operation and transferring the tapped parts to a subsequent position and simultaneously transferring and separating another plurality of parts to repeat the cycle.

A further object of the invention is to produce a transfer apparatus particularly useful in connection with metal tapping machinery which may be readily and economically manufactured.

The above objects of the invention may be achieved by an apparatus for transferring parts comprising means for guiding the parts along a path, a plurality of pickup members for the parts, means for moving the pickup members into engagement with the parts, and means for spacing and moving the pickup members for simultaneously moving the parts along the path therefor.

Other objects and advantages of the invention will become readily apparent from considering the following detailed description of a preferred embodiment of the invention in connection with the accompanying drawings, in which:

FIGURE 1 is a top plan view of the transfer apparatus of the invention in direct communication with an associated punch press;

FIGURE 2 is a perspective view of a sheet metal fastener of a type which is satisfactorily transferred by the apparatus of the invention from a punch press to an automatic tapping machine;

FIGURE 3 is a fragmentary elevational view of the transfer apparatus with portions partially broken away to more clearly illustrate the apparatus in its initial position;

FIGURE 4 is a bottom view of the apparatus taken along line 4—4 of FIGURE 3;

FIGURE 5 is a fragmentary sectional view of the apparatus taken along line 5—5 of FIGURE 1;

FIGURE 6 is a fragmentary top plan view of the apparatus illustrated in FIGURE 5 with the fluid actuating mechanism removed adequately to disclose the apparatus;

FIGURE 7 is a fragmentary elevational view of the apparatus illustrated in FIGURE 5 showing the transfer mechanism in its fully extended position;

FIGURE 8 is a fragmentary top plan view of the apparatus illustrated in FIGURE 7 with the fluid actuating mechanism removed more clearly to disclose the apparatus;

FIGURE 9 is a sectional view of the transfer apparatus taken along line 9—9 of FIGURE 3;

FIGURE 10 is a sectional view of the transfer apparatus taken along line 10—10 of FIGURE 3;

FIGURE 11 is a sectional view of the transfer apparatus taken along line 11—11 of FIGURE 7;

FIGURE 12 is a fragmentary elevational view partly in section showing an embodiment of the typical stop mechanism for the parts being transferred; and FIGURES 13a through 13g inclusive are diagrammatic views of the various positions of the pickup members and the associated parts during one cycle duty cycle of the transfer apparatus of the invention.

Referring to the drawings, there is shown in FIGURE 1, a top plan view of a typical production line for producing a sheet metal fastener of the type illustrated in FIGURE 2. A punch press 10 is supplied with a sheet metal strip material from any suitable source, not shown. The press 10 effectively forms the part or fastener 12 illustrated in FIGURE 2 with the exception of the threads 14 on the inner surface of a hollow cylindrical projection 16. The part 12 is fed into the guide track 18 after being fabricated by the press 10 and caused to move along the track by a suitable means such as high pressure air jets disposed in the proximity of the guide track 18 which causes the parts to contact one another in a continuous line. The parts 12 are thereafter delivered to the transfer apparatus 20 by which mechanism they are transferred in spaced relation in predetermined groups to an automatic tapping mechine 22 which is effective to form the threads 14 on the inner surface of the projection 16. Thereafter, the finished parts are directed along the track 18 in the direction of the arrow to a packaging or shipping station, not shown.

The transfer apparatus 20 and the tapping machine 22 are mounted on a machine base 24 which in turn is securely fixed to the floor by any suitable floor engaging means.

The transfer apparatus or unit 20 is made in two separable sections; a base section 26 and an upper section 28. The base section 26 includes a horizontally disposed extended surface plate 30, clearly shown in FIGURES 3, 4, 5, 6, 7, 8, 10 and 11. A fluid pressure transmission device 32 is mounted on the under surface of the plate 30 by a pair of spaced brackets 34. The transmission device 32 may typically be of the hydraulic type comprising a cylinder 36 having a piston (not shown) mounted therein and a piston rod 38 integral with the piston. In order to effect movement of the piston rod 38, fluid pressure may selectively be introduced through fittings 40 and 42 from an external source of pressure fluid. In the event it is desired to move the piston rod 38 in the direction of the solid arrow (FIGURE 4), pressure fluid is introduced through fitting 40 while the fitting 42 communicates freely with a reservoir. On the other hand, if it is desired to move the piston rod 38 in the direction of the dashed arrow (FIGURE 4), pressure fluid is introduced into the cylinder 36 through the fitting 42 while the fitting 40 communicates freely with a reservoir.

A generally L-shaped member 44 is fastened to the free end of the piston rod 38 by a nut 46. The L-shaped member 44 is adapted to slide reciprocatively along the undersurface of the plate 30 and is guided in its movement by a U-shaped guide bracket 48. The upstanding leg members of the U-shaped guide bracket 48 are suitably secured to the under surface of the plate 30, as clearly shown in FIGURE 11.

A pair of upstanding cam follower supports 50 and 52 are press-fitted in suitable apertures in the L-shaped member 44 and are adapted to extend upwardly through elongate slots 54 and 56 respectively, formed in the plate 30. The extreme upper ends of the cam follower members 50 and 52 are provided with rotatively mounted cam followers 58 and 60, respectively.

The upper section 28 of the transfer unit 20 comprises a housing including a base 70; spaced end walls 72, 74; a side wall 75; and an upper wall 76. It will be noted from an examination of FIGURE 6 that the upper wall 76 is provided with an elongate slot 78; the purpose of which will be explained hereinafter. The side portion of the housing opposite the side wall 75 and facing the guide track 18 is open. The base section 70 is provided with a pair of spaced elongate slots 54' and 56' extending at substantially a forty-five degree relation with respect to their respective associated slots 54 and 56 in the plate 30 of the base member 26.

A pair of spaced slide rods 80 and 82 are arranged within the housing of the upper section 28 and extend between the opposing end walls 72 and 74. The respective ends of the slide rods 80 and 82 are typically received within suitable apertures in the opposing end walls thereby to provide adequate support therefor.

A plurality of transversely disposed carrier elements 84 are slidably mounted on the slide rods 80 and 82. Each of the carrier elements 84 is provided with a pickup finger 88 which is adapted to project through the open side of the housing of the upper section 28 and will be received within an aperture in a respective part to be moved or transferred as will be fully explained hereinafter.

The carrier elements 84 are all of equal transverse lengths but are of varying depths. As is clearly illustrated in FIGURE 5, the bottom surfaces of the carrier elements 84 are stepped. The carrier element 84 having the greatest dimension below the slide rods 80 and 82 is the one closest to the end wall 72, while the one having the least dimension below the slide rods is the one closest to the opposite end wall 74.

The top surface of each of the carrier elements 84 is provided with an upstanding stud 86 which is centrally disposed between the supporting slide rods. The studs 86 progressively vary in their lengths in a stepped relation opposite to the stepped relation of the bottom of the carrier elements. It will be noted that the studs 86 are stepped to increase in dimension from the one closest to the end wall 72 toward the opposite end wall 74. The stud closest to the end wall 74 is attached to a stepped slide bar 90 which in turn is connected to the piston rod 92 of a fluid pressure transfer cylinder 94. The cylinder 94 is securely mounted on the upper surface of the upper wall 76 of the housing and selectively communicates with a source of pressure fluid through the fittings 96 and 98. The transfer cylinder 94 is effective to impart movement of the stepped slide bar 90 into and out of the transfer housing by the selective introduction of pressure fluid into one or the other of the fittings 96 and 98.

It will be noticed that the inner end of the slide bar 90 is suitably fixed to the innermost carrier element 84 by its upstanding stud 86. The stud 86 on the next adjacent carrier element 84 projects upwardly through an elongate slot 100 formed in the slide bar 90.

When the apparatus is in the position illustrated in FIGURES 3, 5 and 6, pressure fluid is introduced into the transfer cylinder 94 through the fittings 96, so that the piston rod 92 is moved inwardly of the cylinder 94 causing similar movement to the stepped slide bar 90. As the slide bar 90 moves, the innermost carrier element 84, which is integrally fastened thereto, moves with the slide bar; the marginal edge of the slot contacts its respective upstanding stud 86; and the stepped under surface of the slide bar contacts and moves respective other ones of the studs 86. Thereby, the carrier elements 84 and their associated fingers 88 are spaced apart and are advanced along the longitudinal axis of the slide rods 80 and 82.

The inward movement of the slide rod 90 is limited and arrested by a stop 102. The inward movement of the carrier elements 84, with the exception of the one fastened to the slide bar 90, is limited by a plurality of upstanding studs or stop members 104. As the carrier elements 84 are carried inwardly by the slide bar 90, the stepped bottom surfaces thereof contact respective ones of the plurality of spaced upstanding stop members 104. The carrier elements 84 are then effectively held in spaced relation between the stepped under surface of the slide rod 90 and the respective stop member 104, as illustrated in FIGURES 7 and 8.

When pressure fluid is introduced into the transfer cylinder 94 through the fitting 98, the piston rod 92 and the slide rod 90 are moved outwardly to assume the position shown in FIGURES 3, 5 and 6. The innermost carrier element 84, which is secured to the slide rod 90, pushes against the adjacent carrier element which in turn pushes against the next adjacent element until they are all moved to the extreme outer position whereupon the outermost carrier element 84 engages a spring based stop mechanism which is comprised of a plunger 106 and a helical spring 108. Manifestly, the stop mechanism cushions the impact of the carrier elements 84 when they are moved back to their initial position.

Two spaced rotatably mounted guide wheels 110 and 112 depend from the under surface of the base 70 of the housing of the upper section 28 and are adapted to be received in transversely extending elongate slots 114 and 116, respectively, formed in the upper plate 30 of the base section 26. A clear illustration of the structure is shown in FIGURES 9 and 10. As will be more fully appreciated hereinafter, the guide wheels 110 and 112 and their associated slots 114 and 116 guide the upper section 28 in its transverse movement with respect to the base section 26 during the transfer cycle of the apparatus.

A stripper bar assembly 120, including a plurality of transversely projecting stripper fingers 122, is attached to the innermost carrier element 84 by a carrier bar 124. The carrier bar 124 is typically similar in structure to the individual carrier elements 84 and is likewise adapted to slide along the spaced slide rods 80 and 82 concomitantly with the movement of the slide bar 90. The stripper bar fingers 122 are spaced apart the same amount as the pickup fingers 88 in their spaced apart position shown in FIGURES 7 and 8.

As illustrated in FIGURES 1, 6, 8, 11 and 12, the guide track 18 is provided with an enlarged rigid section 130 adjacent to the transfer unit 20. The guide track section 130 is provided with a plurality of spaced apart guide cylinders 132 for receiving and guiding the taps of the automatic tapping machine 22. Further, and as clearly illustrated in FIGURES 11 and 12, the guide track section 130 is provided with a spring biased stop member 134 which projects therethrough and into the path of travel of the parts 12. The stop member 134 is normally actuated into a blocking position by a helical spring 136, one end of which is fastened to the guide track section 130 while the opposite end is fastened to a downwardly depending portion 138 of the stop member 134.

A horizontally disposed release rod 140 extends through a suitable opening in the guide track 130 and has its free end projecting beyond the side wall of the guide track 130 and its other end is secured to the depending portion 138 of stop member 134. When the release rod 140 is forced into the guide track 130, the stop member 134 is moved out of the path of travel of the parts 12, allowing the parts to pass freely along the track.

In the extreme left hand position of the carrier members 84 and the associated stripper bar 120, the free end of the release rod 140 engages a slot 142 formed in the left hand end of the stripper bar 120.

*Operation*

As pointed out hereinbefore, the illustrated mechanism is particularly useful for transferring or shifting a predetermined number of parts 12 from a position of intimate contact with adjacent parts to a position of spaced relation wherein the parts are properly indexed or arranged for the reception of tap members of an automatic tapping machine.

The operating duty cycle of the mechanism may be readily understood from the following description considered in connection with FIGURES 13a through 13g inclusive. Initially, the parts 12 formed by the press 10, are serially fed in line along the track 18 to a point where the first part is stopped by the stop member 134, as shown diagrammatically in FIGURE 13a. Next, the cam cylinder 36 is actuated to move the piston rod 138 and the associated L-shaped slide member 44 in the direction of the full-line arrow in FIGURE 4, causing the cam follower supports 50 and 52 to be moved axially along their respective slots 54 and 56 and simultaneously causing the cam followers 58 and 60 to ride along their respective slots 54' and 56' acting to cam the entire upper section 28 toward the guide track portion 130. Manifestly, as the upper section 28 is moved toward the guide track section 130, the assembly of pickup finger 88 are properly indexed to project into the interior of the cylindrical projections 16 of a group of parts 12. The stripper bar 120 is also moved in a similar direction; but at this point in the operation, the stripper bar fingers 122 do not engage any parts. However, the portion of the stripper bar 120 adjacent the notch or slot 142 forces the release rod 140 into the track section 130, causing the stop member 134 to be depressed and move free of the parts 12.

The following sequence of the duty cycle is achieved through the actuation of the transfer cylinder 94. Pressure fluid is admitted thereto through the fitting 96, causing the piston rod 92 and its associated stepped slide rod 90 to move from the position illustrated in FIGURES 3, 4 and 6 to assume the position illustrated in FIGURES 7, 8 and 13c. It will be noted that the stepped under surface of the slide bar 90 contacts the stubs 86 of the carrier elements 84 sequentially and then functions to separate the carrier elements 84 and the associated pickup fingers 88 properly to space the parts 12 carried thereby so as to enable the cylindrical projections 16 to be in axial alignment with the tap-receiving guide cylinders 132.

As the fourth step in the operating cycle of the mechanism, the cam cylinder 36 is actuated to move the piston rod 138 and the associated L-shaped slide member 44 in the direction of the dashed arrow in FIGURE 4, causing the upper section 28 to move transversely of the base section 26 thereby to move the carrier elements 84 in their respective pickup fingers 88 and the stripper bar 120, away from the guide track section 130, as diagrammatically illustrated in FIGURE 13d. Simultaneously, the lead screw (not shown) of the automatic tapping machine 22 moves the associated taps through the guide cylinders 132 and then into the interior of the hollow projection 16 of the parts 12 to form an internal thread 14.

The above movement of the apparatus is caused by introducing pressure fluid into the cam cylinder 36 through the fitting 34 to drive the piston 38 and its associated L-shaped slide members 44 in the direction of the dashed arrow in FIGURE 4. Thereby, the cam followers 58 and 60 ride in the elongate slots 54' and 56', respectively, camming the entire upper section 28 away from the guide track portion 130. Simultaneously, the assembly of pickup fingers 88 and the stripper bar 120 are moved.

The fifth step of the operating cycle is diagrammatically illustrated in FIGURE 13c which is brought about by introducing pressure fluid into the transfer cylinder 94 through the fitting 98 causing the piston rod 92 and the stepped slide bar 90 to move in the direction of the arrow in FIGURE 13c, thereby moving the carrier elements 84, the associated pickup fingers 88, and the stripper bar 120.

The above movement of the stepped slide bar 90 from the position shown in FIGURES 7 and 8 to the position shown in FIGURES 5 and 6 effected by the transfer cylinder 94, slides the assembly of carrier elements 84 from a position of spaced relation to one of intimate contact. Thereafter, the pickup fingers 88 are properly indexed to pick up a new group of parts 12.

The next step of the operating cycle of the mechanism further to the initial step illustrated in FIGURE 13a is diagrammatically illustrated in FIGURE 13f, wherein the pickup fingers 88 are moved into the cylindrical projections 16 of the parts 12; the spaced fingers 122 of the stripper bar 120 are simultaneously moved into some projections of the parts 12 which have been threaded; and the stop member 134 is forced out of the path of parts 12. This action is achieved by activating the cam cylinder 36 in the same manner as described in connection with the description of the initial operating step of the duty cycle.

Finally, the carrier elements 84, pickup fingers 88, the stripper bar 120, and the stripper bar fingers are moved axially of the apparatus as illustrated in FIGURE 13g. This movement is effected in the same manner as that described in connection with FIGURE 13c. By such movement, a new set of parts is spaced and transferred along the track by the pickup fingers 88 to a tapping position, while the set of parts which have been tapped is transferred along the track by the stripper bar fingers 122.

The cycle is then repeated at a speed commensurate with the speed at which the press 10 forms the parts 12 and enables a continuous production line set-up.

From the above description, it will be manifest that I have produced a feeding and tapping mechanism which may be readily attached to existing presses without requiring material alteration thereof and will enable the parts produced by the presses to be tapped at a rate equal to the rate which the parts are formed. The mechanism enables small sheet metal nuts to be manufactured in large quantities on an exceedingly economical basis.

In accordance with the provisions of the patent statutes, I have explained the principle and mode of operation of my invention and have illustrated and described what I now consider to represent its best embodiment. However, I desire to have it understood that, within the scope of the appended claims, the invention may be practiced otherwise than is specifically illustrated and described.

What I claim is:

1. Feeding and tapping mechanism comprising in combination:
   means to form a continuous row of juxtaposed parts to be tapped;
   a battery of spaced apart power operated tappers arranged in a row and spaced from said juxtaposed parts; and
   a recurrently operated transfer device including a base section having a longitudinal axis, an upper section having a plurality of pickup members, means for moving said upper section and pickup members transversely to the longitudinal axis of said base section to engage a predetermined number of the juxtaposed parts, and means for advancing said pickup members and the associated parts to said tappers and simultaneously spacing said pickup members a distance apart greater than the normal spacing therebetween, the spacing conforming to the spacing of said tappers for enabling the latter to concomitantly tap the parts advanced thereto.

2. The mechanism defined in claim 1 wherein means are provided in said upper section for slidably mounting said pickup members along an axis parallel to the longitudinal axis of said base section.

3. Feeding and tapping mechanism as defined in claim 1 wherein said means for spacing said pickup members includes a power actuated slide bar having a stepped bottom portion for selective engagement with said members, said stepped portions being spaced a distance greater from one another than the normal spacing between said pickup members.

4. Feeding and tapping mechanism comprising in combination; a source of parts to be tapped, guide means communicating at one end with said source; means for advancing the parts through said guide means from the source thereof to form a continuous row of parts; a plurality of power driven spaced tappers arranged in spaced relation; a transfer mechanism for engaging a plurality of the parts from said row, advancing the parts to said tappers, and spacing the parts to conform to the spacing of said tappers, said transfer mechanism including a base section, an upper section mounted on said base section, means for effecting transverse rectilinear movement of said upper section with respect to said base section toward and away from the parts, pickup fingers mounted for slidable movement between limits in said upper section, each of said fingers having a part-engaging portion extending outwardly of a side wall of said upper section, said pickup fingers being adapted to engage one another in juxtaposition adjacent one limit, means for advancing said pickup fingers toward said tappers and for simultaneously spacing said pickup fingers to conform to the spacing of said tappers, and means for discharging the parts after being tapped by said tappers.

5. Feeding and tapping mechanism as defined in claim 4 wherein said means for effecting transverse rectilinear movement of said upper section with respect to said base section includes at least two elongate slots provided in said base section, said slots being disposed at right angles to one another, an elongate slot provided in said upper section and arranged in overlapping relation and at an angle to one of the slots in said base section and having one of the ends thereof in alignment with a respective end of said one slot in said base section, a first cam follower extending through said one slot in said base section and into sliding engagement with said slot in said upper section, means for driving said first cam follower between the ends of said one slot in said base section, a second cam follower secured to said upper section and extending into said other slot in said base section, wherein when first said cam follower is driven in one direction said upper section is caused to move in one transverse direction to said base section and when driven in an opposite direction said upper section is moved in an opposite transverse direction.

6. Feeding and tapping mechanism as defined in claim 5 wherein said means for advancing said pickup fingers toward said tappers and for simultaneously spacing said pickup fingers includes a slide bar having a stepped bottom portion for selective engagement with said pickup fingers, said stepped portions being spaced from one another a distance greater than the normal spacing between said pickup fingers; and means for moving said slide bar axially of said upper section in a direction substantially parallel to the direction of movement of the parts.

References Cited by the Examiner

UNITED STATES PATENTS

| | | | |
|---|---|---|---|
| 2,620,959 | 12/52 | Merchant | 198—19 |
| 2,814,393 | 11/57 | Buck | 198—34 |
| 2,832,971 | 5/58 | Tesch | 10—21 |

ANDREW R. JUHASZ, *Primary Examiner.*